(12) United States Patent
Zhong et al.

(10) Patent No.: US 10,037,677 B2
(45) Date of Patent: Jul. 31, 2018

(54) SPEECH THERAPEUTIC DEVICES AND METHODS

(71) Applicant: Arizona Board of Regents on behalf of Arizona State University, Scottsdale, AZ (US)

(72) Inventors: Xuan Zhong, Tempe, AZ (US); William Yost, Scottsdale, AZ (US); Michael Dorman, Scottsdale, AZ (US); Julie Liss, Scottsdale, AZ (US); Visar Berisha, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 15/492,105

(22) Filed: Apr. 20, 2017

(65) Prior Publication Data
US 2017/0309154 A1  Oct. 26, 2017

Related U.S. Application Data

(60) Provisional application No. 62/325,070, filed on Apr. 20, 2016.

(51) Int. Cl.
*G08B 21/18* (2006.01)
*G10L 25/78* (2013.01)
(Continued)

(52) U.S. Cl.
CPC ............. *G08B 21/182* (2013.01); *G09B 5/00* (2013.01); *G09B 19/04* (2013.01); *G10L 25/78* (2013.01); *G10L 2025/783* (2013.01)

(58) Field of Classification Search
CPC ........ G08B 21/182; G09B 5/00; G09B 19/04; G10L 25/78; G10L 2025/783; G10L 15/20; H04R 29/00; H04R 1/1091; G06F 3/16
See application file for complete search history.

(56) References Cited

U.S. PATENT DOCUMENTS 4,460,342 A  7/1984 Mills
5,794,203 A  8/1998 Kehoe
(Continued)

OTHER PUBLICATIONS

Matos, Carlos, et al., "Updates to PDA-Enhanced Speech Treatment for Parkinson's Disease," Poster Display, Research Frontiers & Partnerships in Cognitive Disability and Technology Conference, Sep. 26-27, 2002, Boulder, Colorado, 1 page.
(Continued)

*Primary Examiner* — Orlando Bousono
(74) *Attorney, Agent, or Firm* — Withrow & Terranova, P.L.L.C.; Vincent K. Gustafson

(57) ABSTRACT

Disclosed herein are speech therapeutic devices and methods. In one aspect, the speech therapeutic device includes audio input circuitry, signal processing circuitry, and stimulus circuitry. In certain embodiments, the audio input circuitry is configured to provide an input signal that is indicative of speech provided by a user and the signal processing circuitry is configured to utilize a reconfigurable rule that includes a condition, receive the input signal, process the input signal using the reconfigurable rule, and provide an alert signal responsive to attainment of the condition. The stimulus circuitry is configured to receive the alert signal and provide a stimulus to the user. The signal processing circuitry is additionally configured to (i) receive the reconfigurable rule from a communication network, and/or (ii) generate a record indicative of the alert signal, store the record in a memory, and send the record to a communication network.

20 Claims, 10 Drawing Sheets

(51) Int. Cl.
*G09B 19/04* (2006.01)
*G09B 5/00* (2006.01)

(56) References Cited

U.S. PATENT DOCUMENTS

| | | | |
|---|---|---|---|
| 8,019,050 B2 | 9/2011 | Mactavish et al. | |
| 8,275,624 B2 | 9/2012 | Kehoe | |
| 9,263,043 B2 | 2/2016 | Snyder et al. | |
| 2001/0032085 A1* | 10/2001 | Goedeke | A61N 1/37247 |
| | | | 704/275 |
| 2004/0135699 A1* | 7/2004 | Salzhauer | G08B 1/08 |
| | | | 340/691.1 |
| 2004/0260547 A1 | 12/2004 | Cohen et al. | |
| 2005/0027515 A1* | 2/2005 | Huang | G10L 15/20 |
| | | | 704/215 |
| 2005/0033571 A1* | 2/2005 | Huang | G10L 15/20 |
| | | | 704/231 |
| 2005/0057357 A1* | 3/2005 | Helal | A61B 5/0062 |
| | | | 340/539.13 |
| 2006/0093997 A1* | 5/2006 | Kearby | G09B 21/009 |
| | | | 434/185 |
| 2006/0183964 A1 | 8/2006 | Kehoe | |
| 2007/0204694 A1* | 9/2007 | Davis | A61B 5/121 |
| | | | 73/585 |
| 2008/0121038 A1* | 5/2008 | Davis | A61B 5/121 |
| | | | 73/585 |
| 2008/0253583 A1* | 10/2008 | Goldstein | H04R 1/1091 |
| | | | 381/92 |
| 2011/0257464 A1 | 10/2011 | Kehoe | |
| 2012/0123573 A1* | 5/2012 | Goldstein | H04R 1/1091 |
| | | | 700/94 |
| 2012/0130154 A1 | 5/2012 | Sajan et al. | |
| 2012/0288119 A1* | 11/2012 | Apfel | H03G 3/3089 |
| | | | 381/101 |
| 2013/0303940 A1* | 11/2013 | Saly | A61B 5/123 |
| | | | 600/559 |
| 2014/0012403 A1* | 1/2014 | Goldstein | H04R 1/1091 |
| | | | 700/94 |
| 2014/0278387 A1* | 9/2014 | DiGregorio | G10L 15/20 |
| | | | 704/231 |
| 2014/0278391 A1* | 9/2014 | Braho | G10L 15/20 |
| | | | 704/233 |
| 2015/0156595 A1 | 6/2015 | Zhong et al. | |
| 2015/0302853 A1* | 10/2015 | Braho | G10L 15/20 |
| | | | 704/233 |
| 2016/0029131 A1 | 1/2016 | Merks | |
| 2016/0135735 A1* | 5/2016 | Bowers | A61B 5/4833 |
| | | | 704/271 |
| 2016/0140321 A1* | 5/2016 | Bowers | G06F 19/3487 |
| | | | 704/271 |
| 2016/0256067 A1* | 9/2016 | Low | A61B 5/7246 |
| 2017/0154637 A1* | 6/2017 | Chu | G10L 25/48 |

OTHER PUBLICATIONS

Vasquez-Correa, J.C., et al., "Automatic Detection of Parkinson's Disease from Continuous Speech Recorded in Non-Controlled Noise Conditions," Sixteenth Annual Conference of the International Speech Communication Association, Sep. 6-10, 2015, Dresden, Germany, ISCA, pp. 105-109.

Vasquez-Correa, J.C., et al., "New computer aided device for real time analysis of speech of people with Parkinson's disease," University of Antioquia Faculty of Engineering Magazine, No. 72, Sep. 2014, pp. 87-103.

* cited by examiner

SPEECH THERAPEUTIC DEVICES AND METHODS

STATEMENT OF RELATED APPLICATIONS

This application claims the benefit of U.S. Provisional Patent Application No. 62/325,070 filed on Apr. 20, 2016, the disclosure of which is hereby incorporated by reference herein in its entirety.

GOVERNMENT RIGHTS IN INVENTION

This invention was made with government support under R21 DC012558 awarded by the National Institutes of Health. The government has certain rights in the invention.

TECHNICAL FIELD

This disclosure relates to devices and methods for speech therapy.

BACKGROUND

Methods for treating speech and language pathologies are typically provided in face-to-face training sessions between pathologists and patients. Such methods can be inefficient and ineffective. Patients may only receive feedback during the training sessions, and any improvements made during training sessions may be lost if training sessions are not sufficiently frequent. Numerous speech pathologies cause patients to engage in speech therapy. Hypophonia (i.e., speaking too softly) is one example of a speech condition in which a patient may benefit from continuous feedback, to inform the patient of the need to adjust speech volume level and prompt the patient to take corrective action to cause the patient's speech volume level to be acceptable to others in conversation.

SUMMARY

The present disclosure relates to a speech therapeutic device that includes audio input circuitry, signal processing circuitry, and stimulus circuitry. In one aspect, the audio input circuitry is configured to provide an input signal that is indicative of speech provided by a user; and the signal processing circuitry is configured to utilize at least one reconfigurable rule that includes at least one condition, wherein the signal processing circuitry is further configured to: receive the input signal; process the input signal using the at least one reconfigurable rule; and provide an alert signal responsive to attainment of the at least one condition. The stimulus circuitry is configured to receive the alert signal and provide a stimulus to the user. The signal processing circuitry is additionally configured to perform at least one of the following items (i) or (ii): (i) receive the at least one reconfigurable rule from at least one communication network; or (ii) generate a record indicative of the alert signal, store the record in a memory, and send the record to at least one communication network.

In certain embodiments, the signal processing circuitry is configured to receive the at least one reconfigurable rule from the at least one communication network.

In certain embodiments, the signal processing circuitry is configured to generate a record indicative of the alert signal, store the record in a memory, and send the record to the at least one communication network.

In certain embodiments, the signal processing circuitry comprises audio processing circuitry.

In certain embodiments, the record comprises a rule identifier and an audio segment indicative of the speech provided by the user at least one second before the alert signal and at least one second after the alert signal. Other time intervals may be used. In certain embodiments, the audio segment may be indicative of the speech provided by the user at least three seconds, at least five seconds, or at least ten seconds before the alert signal and at least three seconds, at least five seconds, or at least ten seconds after the alert signal.

In certain embodiments, the record comprises a time stamp indicative of the alert signal.

In certain embodiments, the record comprises a location identifier. In certain embodiments, the location identifier comprises a Global Positioning System (GPS) coordinate. In certain embodiments, the location identifier comprises a point of interest.

In certain embodiments, the speech therapeutic device comprises at least one of a behind-the-ear device, an ear-mold device, a headset, a headband, or a smartphone.

In certain embodiments, the at least one condition comprises an energy level of the speech indicative of a volume level, and a time interval. In certain embodiments, parameters of the at least one reconfigurable rule are configured to be altered to adjust a volume level threshold of the at least one condition.

In certain embodiments, the at least one communication network comprises at least one of a personal area network (PAN), a local area network (LAN), or a wide area network (WAN). In certain embodiments, the at least one communication network comprises the Internet.

In certain embodiments, the at least one reconfigurable rule further includes at least one action that is to be performed when the at least one condition is attained, the at least one action comprising providing to the user at least one of a tactile stimulus, an audible stimulus, or a visual stimulus. In certain embodiments, the at least one action comprises providing a voice to the user, wherein the voice indicates at least one speech improvement technique.

In certain embodiments, the speech therapeutic device further comprises at least one of the following features (A) or (B): (A) the audio input circuitry comprises at least one bone conduction microphone; or (B) the stimulus circuitry comprises at least one bone conduction speaker. In certain embodiments, the stimulus circuitry comprises at least one vibrational transducer and at least one power amplifier. In some embodiments, the at least one vibrational transducer may comprise a piezo-electric vibrator, a moving coil vibrator, a linear resonant actuator, a miniaturized vibration motor, or a combination thereof.

In certain embodiments, the at least one condition comprises at least one of a phonation quality, a stutter condition, or a stammer condition.

In another aspect, a speech therapeutic system comprises: a speech therapeutic device as disclosed herein; and at least one communication server connected to the at least one communication network, wherein the at least one communication server is configured to perform at least one of the following functions (A) or (B): (A) sending the at least one reconfigurable rule to the at least one communication network, or (B) receiving a record from the at least one communication network.

In certain embodiments, the speech therapeutic system further includes a graphical administrator interface configured to permit a speech pathologist or other speech therapeutic professional to monitor the speech therapeutic device and reconfigure the at least one reconfigurable rule (e.g., over the at least one communication network, a local wired connection, and/or a remote wireless connection).

In another aspect, a non-transient computer readable medium contains program instructions for causing a speech therapeutic device to perform a method utilizing at least one reconfigurable rule that includes at least one condition. The method includes: receiving an input signal that is indicative of speech provided by a user; processing the input signal using the at least one reconfigurable rule; providing an alert signal responsive to attainment of the at least one condition; and providing a stimulus to the user indicative of the alert signal; wherein the method further comprises at least one of the following items (i) or (ii): (i) receiving the at least one reconfigurable rule from at least one communication network; or (ii) generating a record indicative of the alert signal, storing the record in a memory, and sending the record to at least one communication network.

In another aspect, a method of operating a speech therapeutic device includes: receiving an input signal that is indicative of speech provided by a user; processing the input signal using at least one reconfigurable rule; providing an alert signal responsive to attainment of at least one condition; and providing a stimulus to the user indicative of the alert signal; wherein the method further comprises at least one of the following items (i) or (ii): (i) receiving the at least one reconfigurable rule from at least one communication network; or (ii) generating a record indicative of the alert signal, storing the record in a memory, and sending the record to at least one communication network.

In certain embodiments, the method comprises receiving the at least one reconfigurable rule from the at least one communication network.

In certain embodiments, the method comprises generating a record indicative of the alert signal, storing the record in a memory, and sending the record to the at least one communication network.

In another aspect, any of the foregoing aspects, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

DETAILED DESCRIPTION

In certain aspects, the present disclosure relates to a speech therapeutic device, a speech therapeutic system, methods of operating a speech therapeutic device, and a non-transient computer readable medium. The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
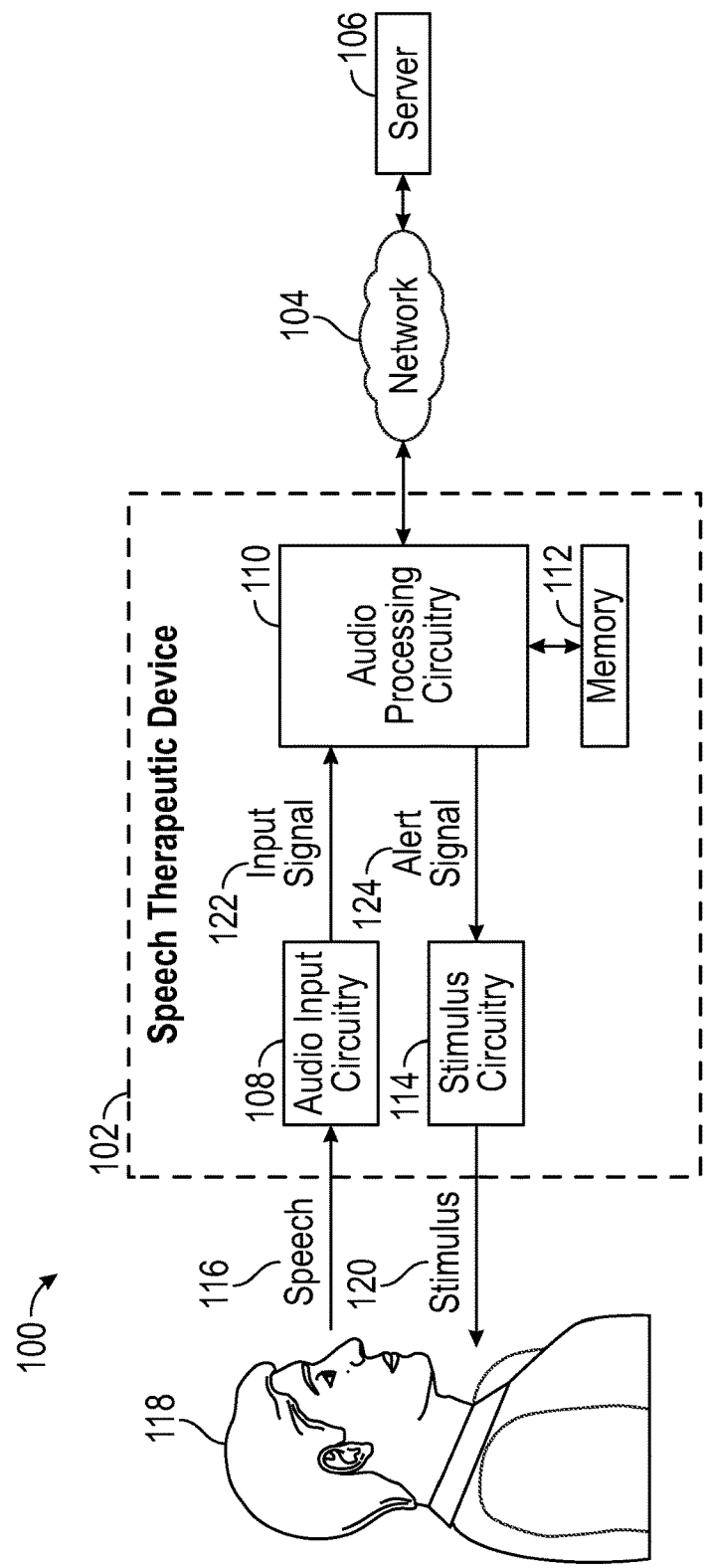
FIG. 1 is a diagram depicting a speech therapeutic system including a speech therapeutic device, a network, and a server; the speech therapeutic device comprising audio input circuitry, signal processing circuitry, a memory, and stimulus circuitry; and the signal processing circuitry being configured to provide an alert signal based on an energy level of speech provided by a user.

FIG. 1 is a diagram of a speech therapeutic system 100 comprising a speech therapeutic device 102, a network 104, and a server 106. The speech therapeutic device 102 comprises audio input circuitry 108, signal processing circuitry 110, memory 112, and stimulus circuitry 114. In certain embodiments, the signal processing circuitry 110 may include, but not necessarily be limited to, audio processing circuitry. The audio input circuitry 108, stimulus circuitry 114, and memory 112 may be coupled with the signal processing circuitry 110 via wired connections, wireless connections, or a combination thereof. The speech therapeutic device 102 may further comprise a behind-the-ear device, an ear-mold device, a headset, a headband, a smartphone, or a combination thereof. The speech therapeutic device 102 may be configured to receive speech 116 from a user 118 and provide a stimulus 120 to the user 118 based on processing the speech 116 using at least one reconfigurable rule.

The audio input circuitry 108 may comprise at least one microphone. In certain embodiments, the audio input circuitry 108 may comprise a bone conduction microphone, a near field air conduction microphone array, or a combination thereof. The audio input circuitry 108 may be configured to provide an input signal 122 that is indicative of the speech 116 provided by the user 118 to the signal processing circuitry 110. The input signal 122 may be formatted as a digital signal, an analog signal, or a combination thereof. In certain embodiments, the audio input circuitry 108 may provide the input signal 122 to the signal processing circuitry 110 over a personal area network (PAN). The PAN may comprise Universal Serial Bus (USB), IEEE 1394 (FireWire) Infrared Data Association (IrDA), Bluetooth, ultra-wideband (UWB), Wi-Fi Direct, or a combination thereof. The audio input circuitry 108 may further comprise at least one analog-to-digital converter (ADC) to provide the input signal 122 in digital format.

The signal processing circuitry 110 may comprise a communication interface (not shown) coupled with the network 104 and a processor (e.g., an electrically operated microprocessor (not shown) configured to execute a predefined and/or a user-defined machine readable instruction set, such as may be embodied in computer software) configured to receive the input signal 122. The communication interface may comprise circuitry for coupling to the PAN, a local area network (LAN), a wide area network (WAN), or a combination thereof. The processor may be configured to receive the at least one reconfigurable rule from the network 104 via the communication interface. The at least one reconfigurable rule may comprise a rule identifier and at least one condition. The rule identifier may be a unique identifier associated with parameters of the at least one reconfigurable rule. In certain embodiments, the at least one condition comprises an error pattern, such as an energy level of the speech 116 indicative of a volume level and a time interval. Other error patterns may be used. In other embodiments, the at least one condition may include a phonation quality, a stutter condition, or a stammer condition, or a combination thereof. The at least one reconfigurable rule may further comprise at least one action that is to be performed when the at least one condition is met. The at least one action may comprise a stimulus type and stimulus time duration indicative of a tactile stimulus, an audible stimulus, a visual stimulus, or a combination thereof. For example, parameters of the rule identifier of the at least one reconfigurable rule may be altered to increase an energy level (e.g., volume level) of speech for detecting the error pattern of low level speech. In this way, the speech volume of the user can gradually increase over time, and thereby mitigate user frustrations.

In certain embodiments, the processor may comprise an ADC to convert the input signal 122 to digital format. In other embodiments, the processor may be configured to receive the input signal 122 from the PAN via the communication interface. The processor may further comprise level detect circuitry, adaptive filter circuitry, voice recognition circuitry, or a combination thereof. The processor may be further configured to process the input signal 122 using the at least one reconfigurable rule and to provide an alert signal 124 to the stimulus circuitry 114. The level detect circuitry may be configured to compare the input signal 122 to a volume level threshold. The alert signal 124 may be in a digital format, an analog format, or a combination thereof. In certain embodiments, the processor may further comprise a digital-to-analog converter (DAC) to provide the alert signal 124 in an analog format. In other embodiments, the processor may provide a pulse width modulated (PWM) signal. The PWM signal may control at least one of a motor, a linear resonator, or a combination thereof. In other embodiments, the processor may provide the alert signal 124 over the PAN via the communication interface.

The processor may be further configured to generate a record indicative of the alert signal 124. The record may comprise the rule identifier and an audio segment indicative of the speech 116 provided by the user 118. In certain embodiments, the audio segment may have a total time duration of at least one second before the alert signal 124 and at least one second after the alert signal 124. Other time intervals may be used. For example, in other embodiments, the audio segment may have a total time duration of at least three seconds, at least five seconds, or at least ten seconds before the alert signal 124 and at least three seconds, at least five seconds, or at least ten seconds after the alert signal 124. In other embodiments, the at least one reconfigurable rule may comprise a pre-alert time duration and a post-alert time duration, wherein the audio segment may have a total time duration of at least the pre-alert time duration before the alert signal 124 and at least the post-alert time duration after the alert signal 124.

The record may further comprise a location identifier, a time stamp, or a combination thereof indicative of the alert signal 124. The location identifier may comprise a Global Positioning System (GPS) coordinate, a street address, a contact name, a point of interest, or a combination thereof. In certain embodiments, a contact name may be derived from the GPS coordinate and a contact list associated with the user 118. The point of interest may be derived from the GPS coordinate and a database including a plurality of points of interest. In certain embodiments, the location identifier may be a filtered location for maintaining the privacy of the user 118. For example, the filtered location may be "user's home", "contact's home", "vehicle in transit", "restaurant", or "user's work". In certain embodiments, the at least one reconfigurable rule may comprise a location type, wherein the location identifier is formatted according to the location type.

The processor may be further configured to store the record in the memory 112. The memory 112 may be a non-volatile memory, a volatile memory, or a combination thereof. The memory 112 may be wired to the signal processing circuitry 110 using an address/data bus. In certain embodiments, the memory 112 may be portable memory coupled with the processor via the PAN.

The processor may be further configured to send the record to the network 104, wherein the network 104 sends the record to the server 106. In certain embodiments, the processor may be further configured to append to the record a device identifier, a user identifier, or a combination thereof. The device identifier may be unique to the speech therapeutic device 102. The user identifier may be unique to the user 118. The device identifier and the user identifier may be useful to a speech pathologist or other speech therapeutic professional, wherein the user 118 may be a patient of the speech pathologist or speech therapeutic professional. In certain embodiments, the at least one reconfigurable rule may be generated by a client device of the speech pathologist.

The stimulus circuitry 114 is configured to receive the alert signal 124 and may comprise a vibrating element, a speaker, a visual indicator, or a combination thereof. In certain embodiments, the alert signal 124 may be a plurality of alert signals including a vibrating element signal, a speaker signal, a visual indicator signal, or a combination thereof. In certain embodiments, the speaker may comprise a single speaker. For example, the single speaker may be implemented in the behind-the-ear device. In other embodiments, the speaker may comprise a plurality of speakers. For example, the plurality of speakers may be implemented in a stereo headset. In certain embodiments, the speaker signal may be an audio signal, wherein the signal processing circuitry 110 may provide the audio signal as voice instructions for the user 118.

The network 104 may comprise a personal area network (PAN), a local area network (LAN), a wide area network (WAN), or a combination thereof. The PAN may comprise Universal Serial Bus (USB), IEEE 1394 (FireWire) Infrared Data Association (IrDA), Bluetooth, ultra-wideband (UWB), Wi-Fi Direct, or a combination thereof. The LAN may include Ethernet, 802.11 WLAN, or a combination thereof. The network 104 may also include the Internet.

The server 106 may comprise a personal computer (PC), a local server connected to the LAN, a remote server connected to the WAN, or a combination thereof. In certain embodiments, the server 106 may be a software-based virtualized server running on a plurality of servers.

As used herein the term "audio sample" may refer to a single discrete number associated with an amplitude at a given time. Certain embodiments may utilize a typical audio sampling rate of 8 kHz or 44.1 kHz. As used herein, the term "audio signal frame" may refer to a number of consecutive audio signal samples. In certain embodiments, a typical length of time associated with an audio signal frame is in a range of from 20 ms to 50 ms. For an audio signal frame of 20 ms at a 8 kHz sampling rate, and for an audio clip of one second, there are 1/20 ms=50 frames, and for each frame there are 8000/50=40 samples.

Figure 2:
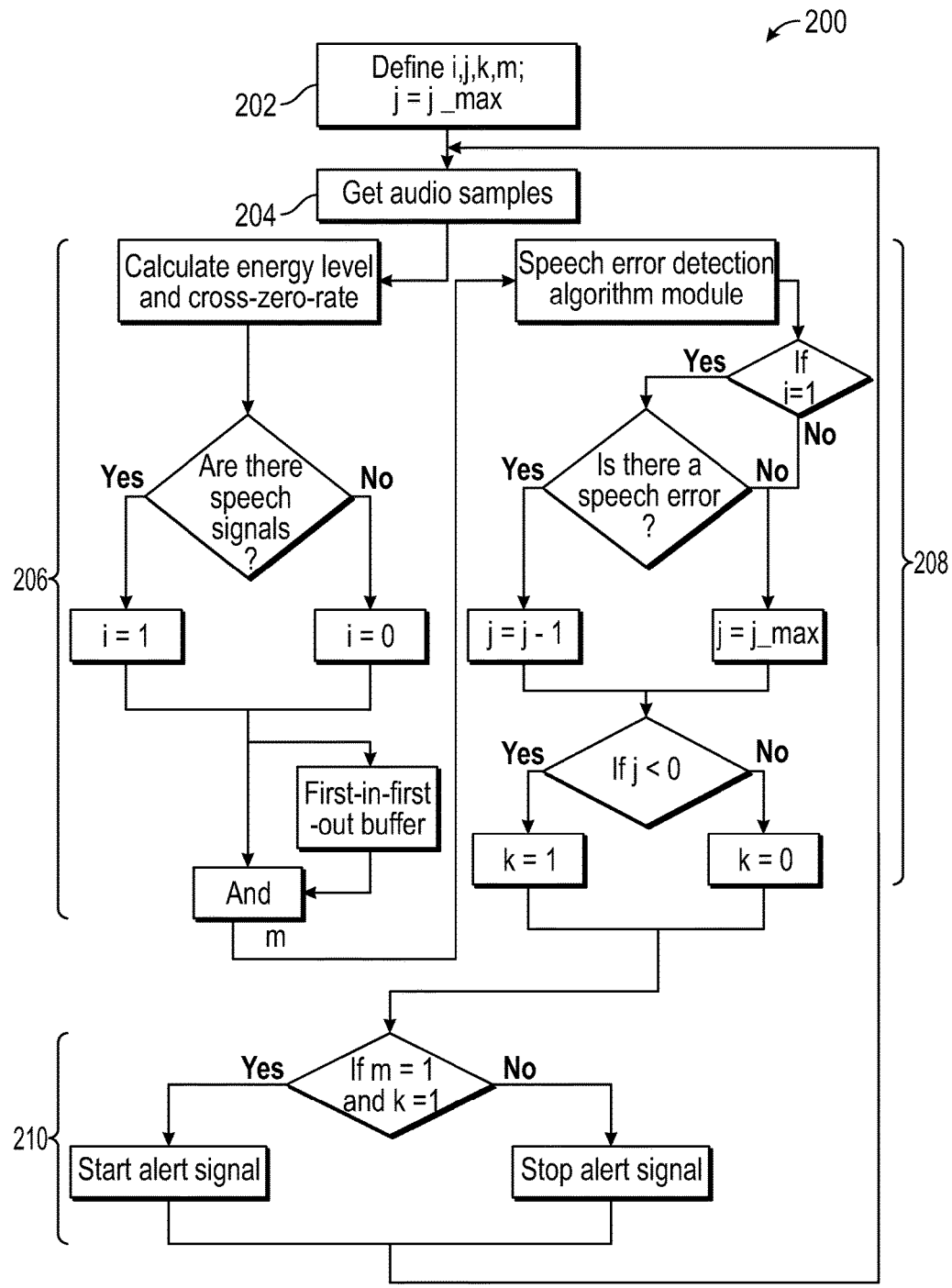
FIG. 2 is flow chart depicting a method for continuous monitoring of speech provided by a user and providing an alert signal, according to one embodiment of the present disclosure.

FIG. 2 is a flow chart depicting a method 200 for continuous monitoring of the speech 116 provided by a user 118 and providing an alert signal 124 (as identified in FIG. 1). The method 200 comprises an alert delay algorithm provided by a processor in a time domain. Although the term "processor" is used in a singular sense, it is to be appreciated that in certain embodiments, multiple processors may be employed, and optionally may be associated with different electronic (e.g., computing) devices. In step 202, the processor is configured to define, or receive definitions for, variables i, j, k, m. In particular, the processor initially sets a counter j to a maximum value (e.g., j=j_max). In step 204, the processor is configured to receive audio samples. The processor is configured to monitor audio samples associated with the speech. In particular, in steps 206, the processor detects whether the audio samples contain speech signals, and in steps 208, the processor determines whether a speech error is present (e.g., the speech level is below the volume level threshold, or another speech error condition is present). In certain embodiments, the processor may monitor multiple (e.g., 10, 20, 30, 40, 50 or more) audio samples per second and provide a multi-second (e.g., 2, 3, 4, 5, 6, 7, 8, 9, or 10 second) delay for the time interval before providing an alert signal 124 (as represented in FIG. 1). In the embodiment depicted in FIG. 2, the maximum value of the counter j is set to 250. In steps 208, if a speech error is detected, the counter decrements by 1 for each consecutive audio sample in which the speech level is below the volume level threshold. In steps 210, when the counter reaches zero or a negative value, the processor provides the alert signal. In other words, when the processor detects speech signals in steps 206 (e.g., i=1), those speech signals are processed through a first-in-first-out buffer (e.g., m=1), and when a speech error has been consistently detected (j<0; k=1) then the processor initiates the alert signal 124 (as represented in FIG. 1). The processor may terminate the alert signal 124 if any one or more of the foregoing conditions cease to be true.

Figure 3:
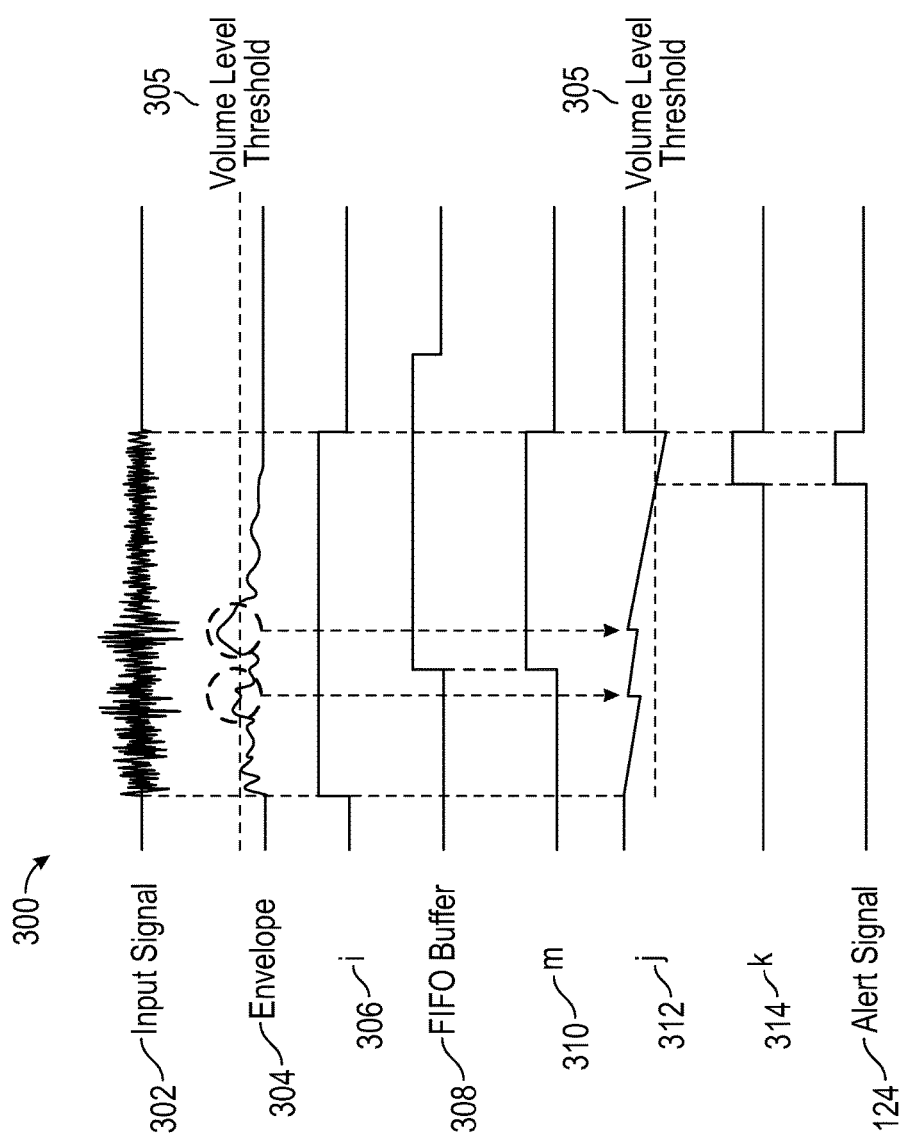
FIG. 3 is a timing diagram depicting the method of providing the alert signal shown in FIG. 2, according to one embodiment of the present disclosure.

FIG. 3 is a timing diagram 300 depicting implementation of steps according to the method 200 for providing the alert signal 124 as shown in FIG. 2. An envelope level 304 of an input signal 302 is detected, a speech signal i 306 is detected, and the energy level is calculated. A first-in-first-out (FIFO) buffer 308 for storing data that arrives to a processor (optionally implemented in a microcontroller (not shown)) is used for detection of the speech signal i 306. In this way, for example, buffering of bytes eases real-time requirements for embedded firmware. Variable m 310 indicates the presence of both the speech signal i 306 and a FIFO buffer 308. The alert signal 124 is initiated when the speech 116 provided by the user 118 (both as shown in FIG. 1) has been detected (embodied as variable m 310) and the envelope level 304 is below a volume level threshold 305 for a time interval (according to counter j 312 and variable k 314). Variable k 314 indicates whether counter j 312 is less than 0. The alert signal 124 is terminated when speech is no longer detected (e.g., according to the value of speech signal i 306) or the envelope level 304 exceeds the volume level threshold 305 (e.g., counter j 312 returns to a maximum value). In certain embodiments, the time interval (counter j 312) is set such that the alert signal 124 will not be provided for a short sentence uttered by the user 118 in which the speech is below the volume level threshold 305.

Figure 4:
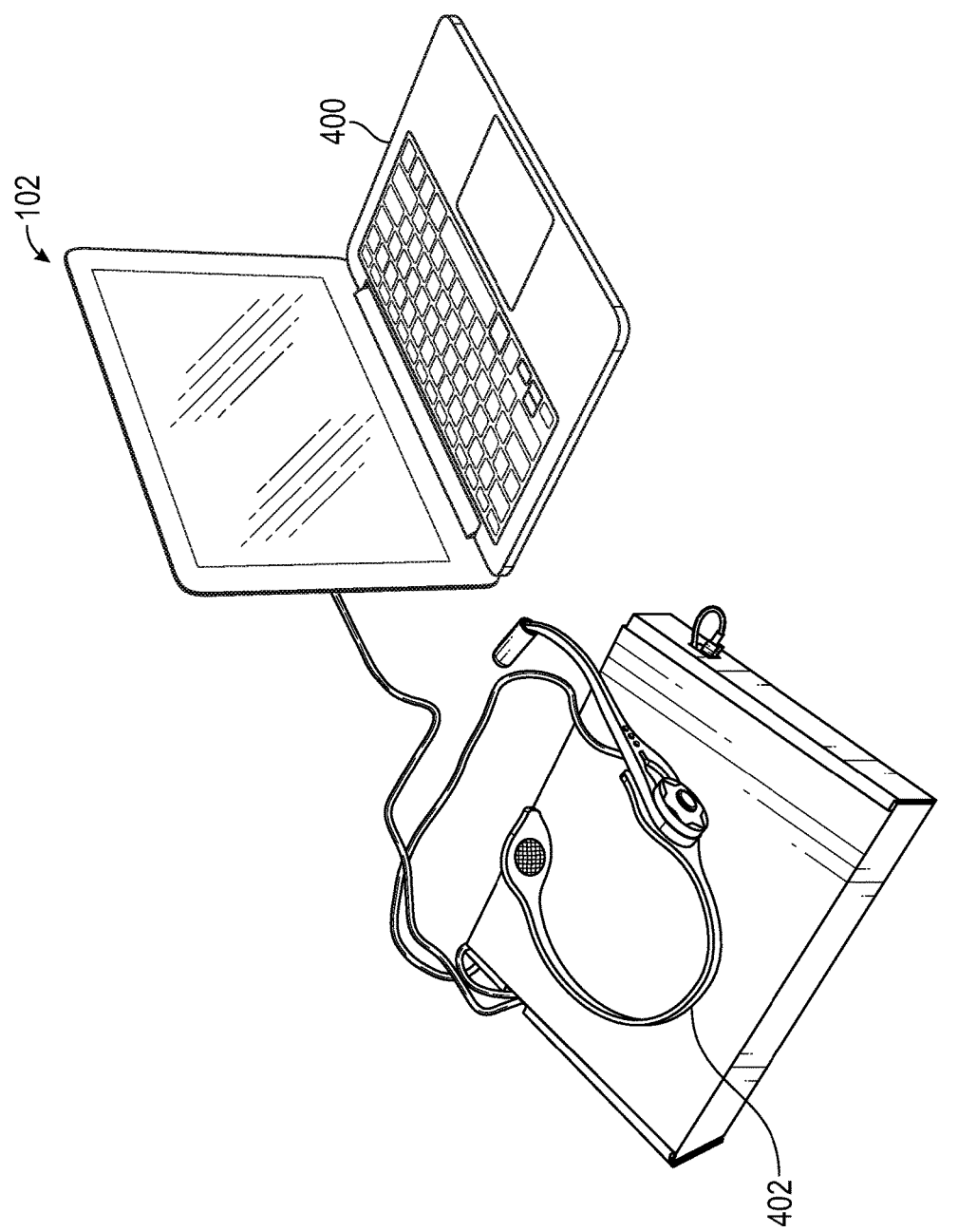
FIG. 4 is a perspective view illustration of a speech therapeutic device comprising a laptop and headset, according to one embodiment of the present disclosure.

FIG. 4 is a perspective view illustration of a speech therapeutic device 102 comprising a laptop computer 400 and headset 402. The laptop computer 400 comprises the signal processing circuitry 110 (see FIG. 1). The headset 402 comprises the audio input circuitry 108 and the stimulus circuitry 114 (see FIG. 1). The laptop computer 400 comprises a non-transient computer readable medium such as a hard drive. The non-transient computer readable medium comprises program instructions for causing the laptop computer 400 to perform a method including (see FIG. 1 for reference): receiving at least one reconfigurable rule from a network 104, the at least one reconfigurable rule including at least one condition; receiving an input signal 122 that is indicative of speech 116 provided by a user 118; processing the input signal 122 using the at least one reconfigurable rule; providing the alert signal 124 responsive to attainment of the at least one condition; providing a stimulus 120 to the user 118 indicative of the alert signal 124; generating a record indicative of the alert signal 124; storing the record in a memory 112; and sending the record to the network 104.

In certain embodiments, the non-transient computer readable medium may be a compact disc (CD), a digital video disc (DVD), a USB drive, or a memory card. In other embodiments, the non-transient computer readable medium may be a network storage device.

Figure 5:
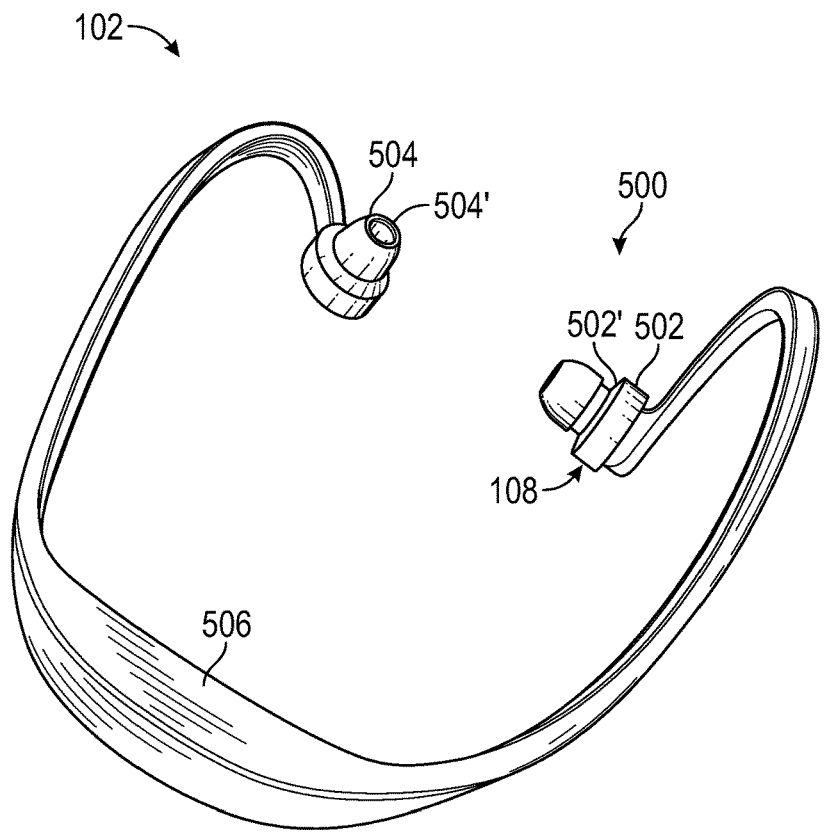
FIG. 5 is a perspective view illustration depicting an embodiment of audio input circuitry and stimulus circuitry comprising a behind-the-neck headset, according to one embodiment of the present disclosure.

FIG. 5 is a perspective view illustration of a speech therapeutic device 102 comprising a behind-the-neck headset 500 comprising audio input circuitry 108 (represented in FIG. 1), stimulus circuitry 114 (represented in FIG. 1), and a band 506, according to one embodiment. The audio input circuitry 108 comprises a bone conduction microphone 502, and the stimulus circuitry comprises a vibrating element 504. The bone conduction microphone 502 is a right capsule 502' of the behind-the-neck headset 500. The vibrating element 504 is a left capsule 504' of the behind-the-neck headset 500 and comprises a motor. In certain embodiments, the band 506 of the behind-the-neck headset 500 comprises a circuit board (e.g., with a wireless module), a battery case, etc.

Figure 6:
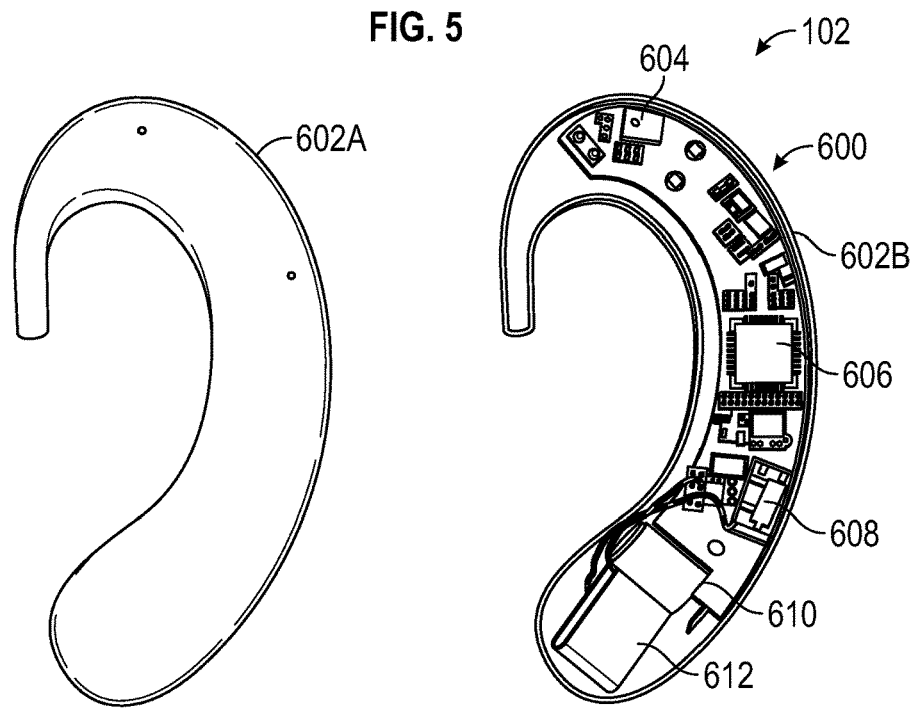
FIG. 6 includes side elevation views of two halves of a speech therapeutic device including a behind-the-ear device, according to one embodiment of the present disclosure.

FIG. 6 provides side elevation views of two halves of a speech therapeutic device 102 implemented as a behind-the-ear device 600, according to one embodiment. The behind-the-ear device 600 comprises a first half 602A and a complementary second half 602B that may be mated together (e.g., with or without fasteners). The behind-the-ear device 600 further comprises at least one microphone 604, a processor (e.g., a microprocessor) 606, a switch 608 (e.g., power switch), a vibrating element 610, and/or a battery 612.

Figure 7:
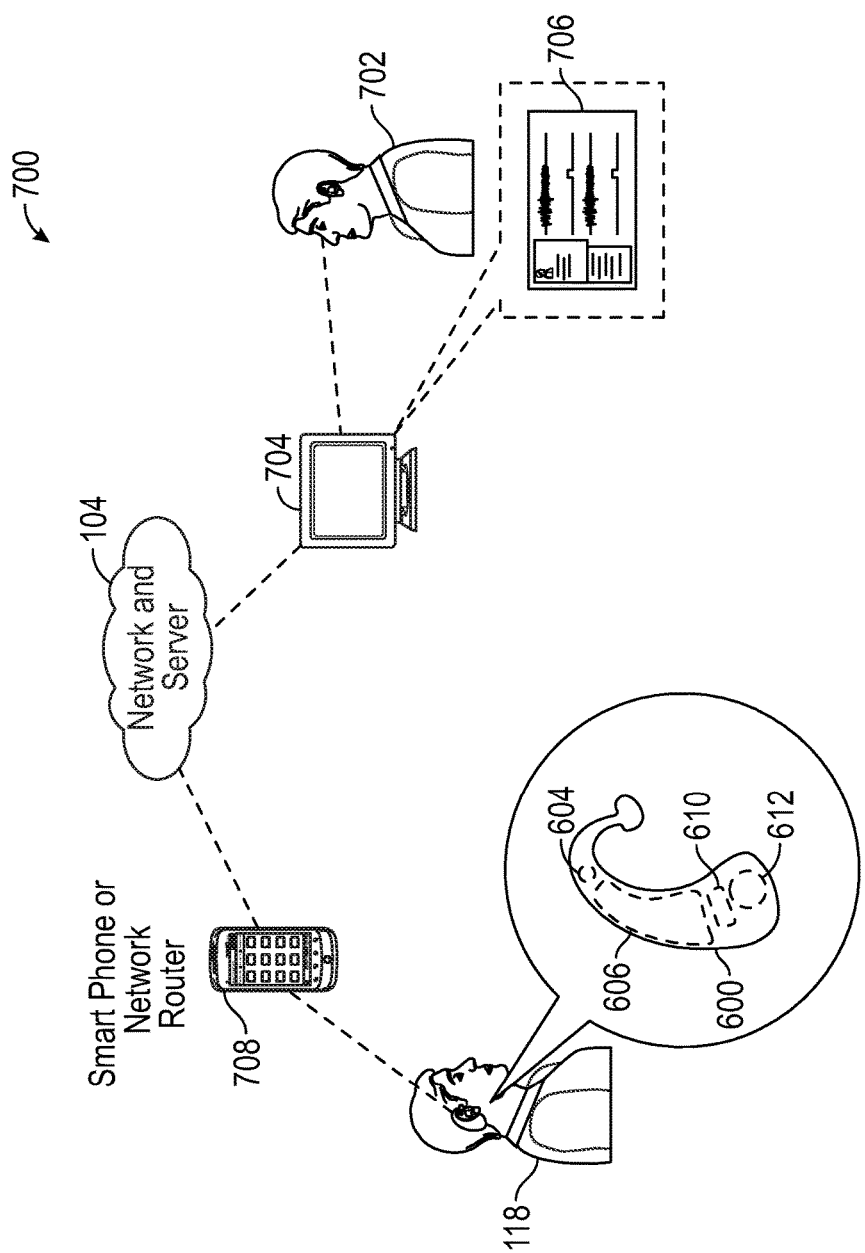
FIG. 7 is a diagram of a speech therapeutic system being used by a speech pathologist via a client device, wherein a user is a patient of the speech pathologist.

FIG. 7 is a diagram depicting a speech therapeutic system 700 being used by a speech pathologist 702 via a client device 704, wherein a user 118 is a patient of the speech pathologist 702. The client device 704 may be a PC, a smartphone, or a tablet device. The client device 704 provides a speech pathologist graphical administrator interface (GAI) portal 706, and may also provide at least one reconfigurable rule to a server 104 (with the client device 704 optionally being remotely located from the server 104 and configured to communicate via a network to receive and/or update at least one reconfigurable rule). In certain embodiments, the speech pathologist GAI portal 706 permits a speech pathologist 702 to monitor error patterns, communicate with the user 118, and/or adjust a course of treatment, such as by altering one or more reconfigurable rules. In certain embodiments, one or more reconfigurable rules to be employed by a therapeutic device 600 may be configured by a speech pathologist 702 in person (e.g., when the speech pathologist 702 is in the presence of the therapeutic device 600 and/or the user 118) via a wired interface or close-proximity wireless interface (e.g., Bluetooth™ or another wireless communication protocol). In certain embodiments, the speech pathologist GAI portal 706 comprises patient information and/or problems and treatment. In certain embodiments, patient information comprises one or more of age, gender, patient identifier, device serial number, etc. In certain embodiments, problems and treatment comprise one or more of a currently loaded algorithm, a currently loaded parameter, error records, error pattern and frequency, etc. In certain embodiments, the speech pathologist 702 may select or alter at least one reconfigurable rule utilizing the speech pathologist GAI portal 706 as part of a course of treatment of the user 118, with such reconfigurable rule being utilized by a therapeutic device (e.g., device 600) in treating of a speech-related problem of the user 118. As shown, the speech therapeutic system 700 further comprises the behind-the-ear device 600 of FIG. 6 being associated with the user 118, wherein the behind-the-ear device 600 includes the microphone 604, processor 606, vibrating element 610, and battery 612. As shown, the behind-the-ear device 600 associated with the user 118 is configured to communicate with a network router 708 (e.g., optionally embodied in a smartphone or other communication-enabled computing device) that is in communication with a client device 704 via a network 104.

Figure 8A:
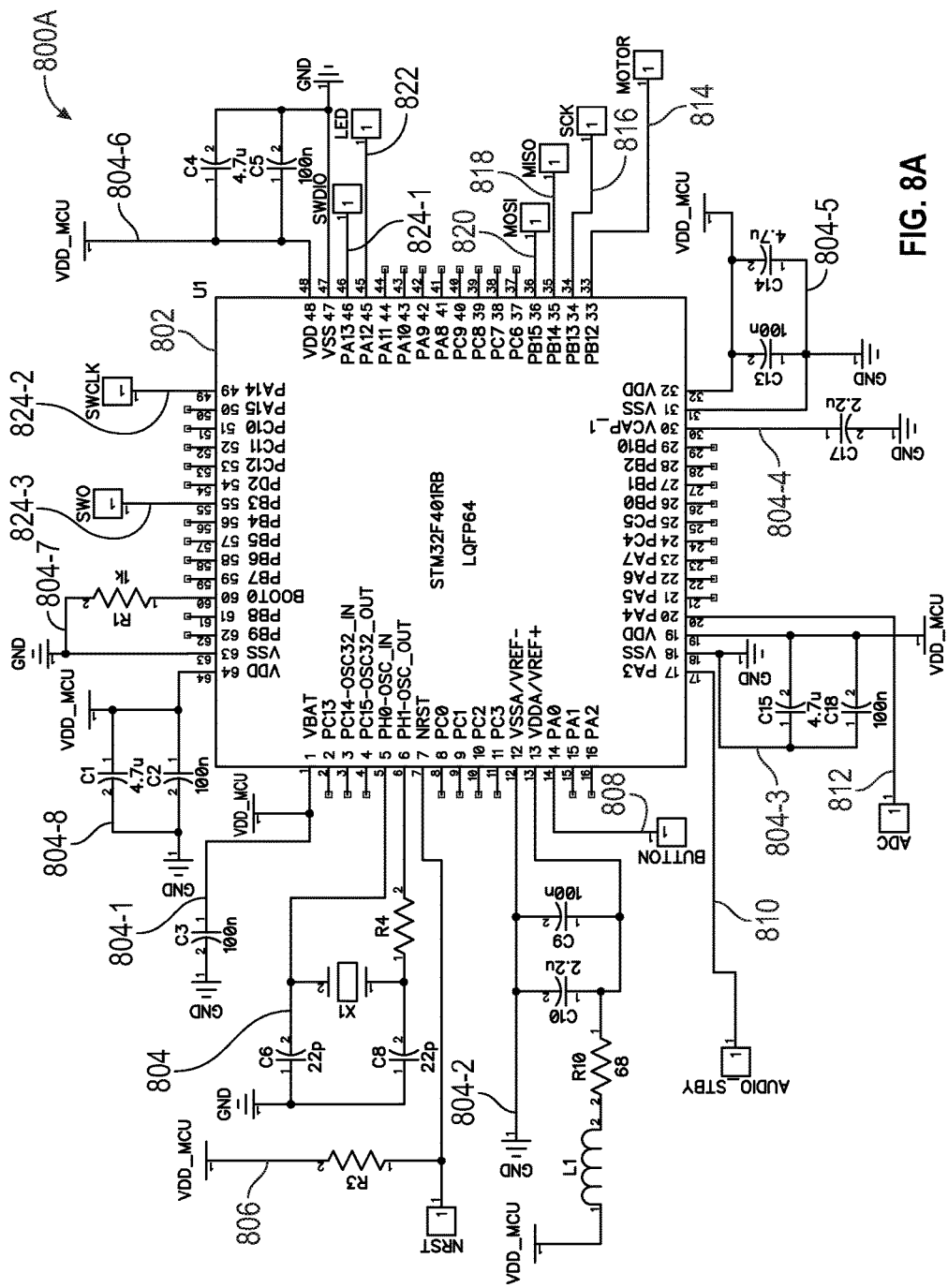
FIGS. 8A-8C are schematic diagrams of electronic circuitry according to one implementation of the speech therapeutic device of FIG. 1.
Figure 8B:
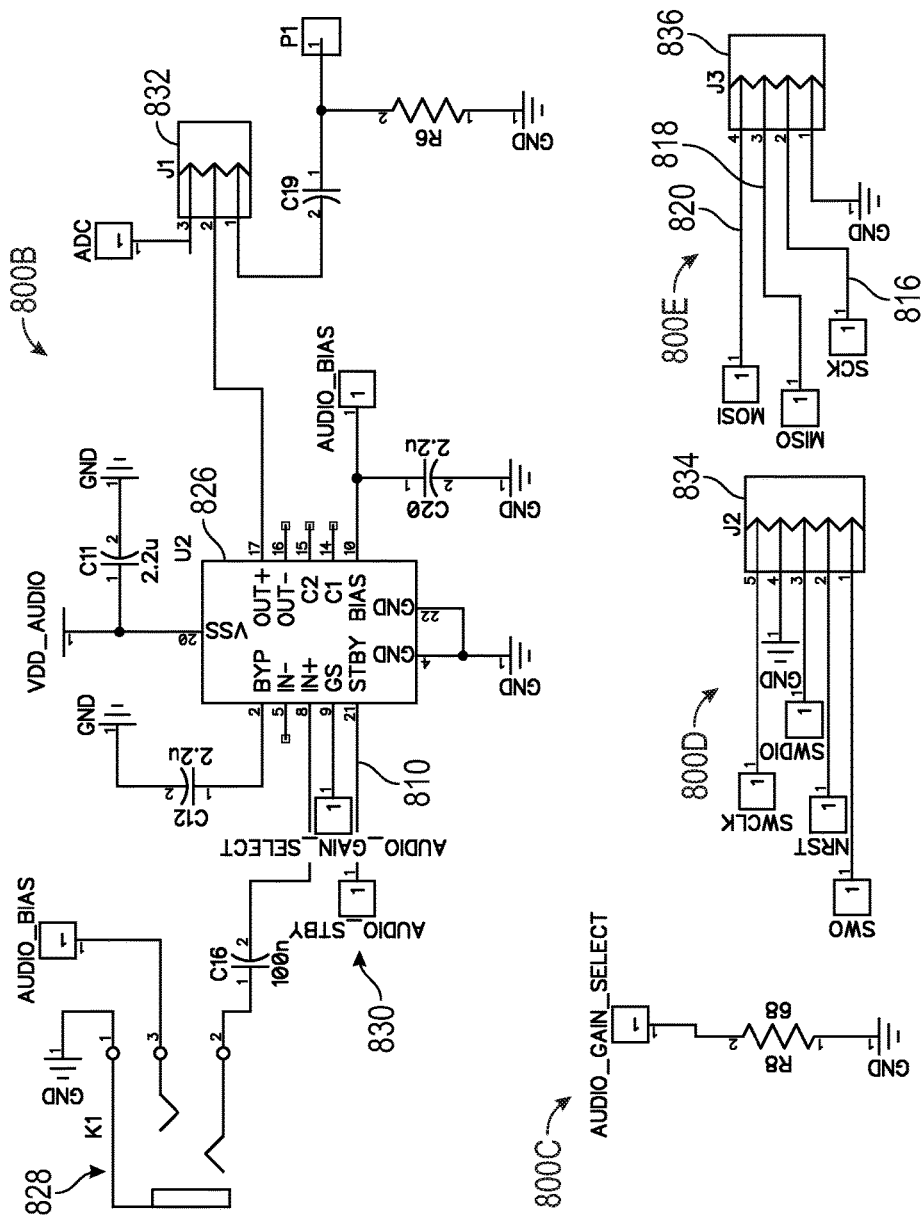
Figure 8C:
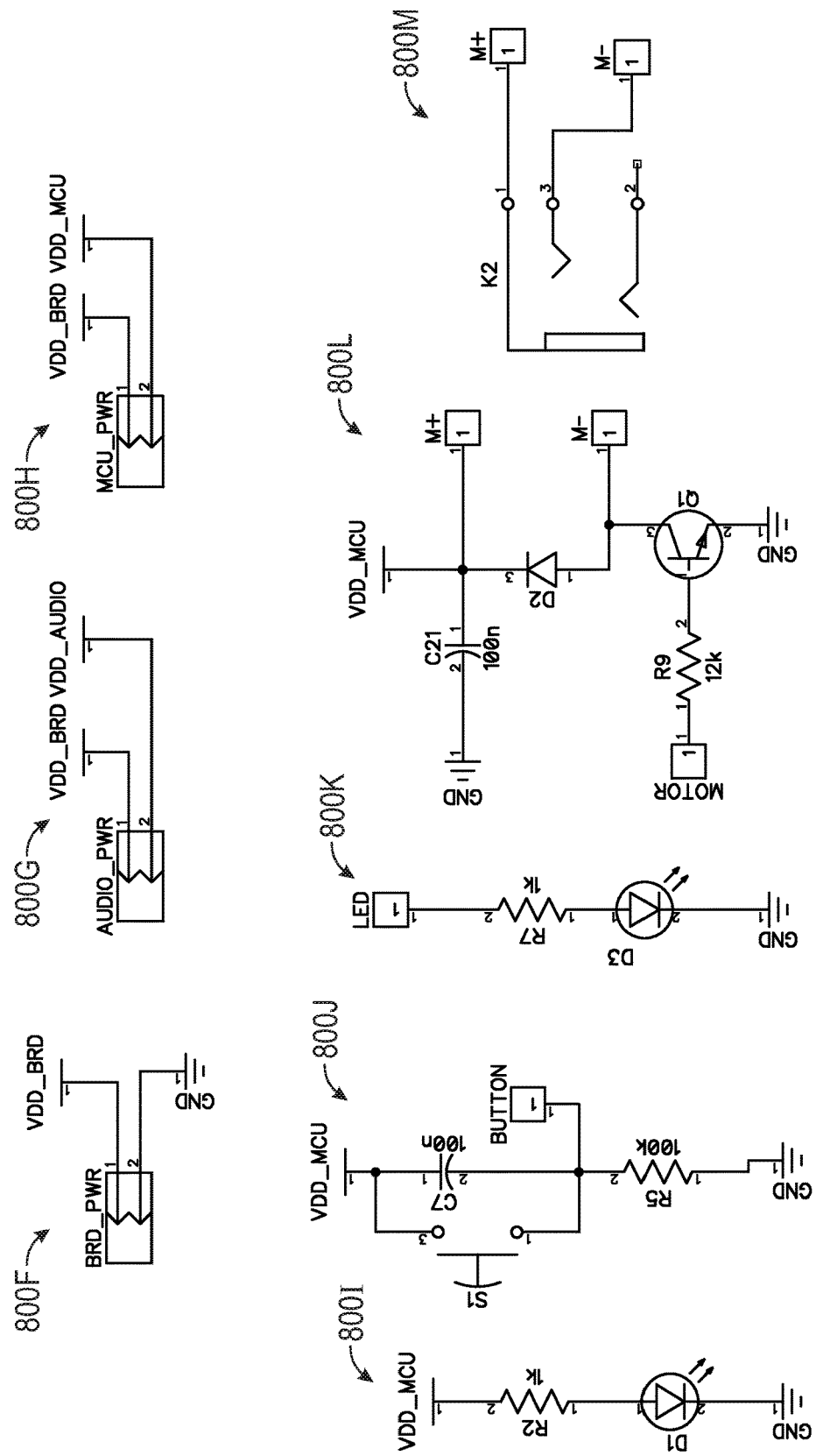

FIGS. 8A-8C are schematic diagrams of electronic circuitry 800A-800M for a speech therapeutic device 102 (e.g., according to FIG. 1). Generally, the electronic circuitry 800A-800M includes circuitry for power, analog signal processing, control (e.g., for peripheral elements such as motors, LEDs, etc.), communication, and/or debugging. Referring to FIG. 8A, the main circuitry 800A includes a microprocessor 802 (e.g., optionally embodied in an ARM microcontroller with digital signal processing capability and internal memory, such as a STM32F401RB low profile quad flat pack (LQFP) microprocessor commercially available from STMicroelectronics (Geneva, Switzerland), although other types of microprocessors could be used). As illustrated, the microprocessor 802 includes 64 pins in electrical communication with one or more external circuits and/or circuit elements. In particular, the microprocessor 802 is in electronic communication with: power-related circuitry 804-1 to 804-8; clock circuitry 805 related to a microprocessor oscillator; reset circuitry 806, and event circuitry 808 related to event triggering (e.g., which may be initiated via a button or other input device); power mode circuitry 810 related to power mode selection (e.g., to control active mode or standby mode of audio preprocessing circuitry); input circuitry 812 related to analog input, such as from an audio preprocessor; motor control circuitry 814 related to motor control (e.g., for providing vibratory or tactile stimulus to a user); clock circuitry 816 related to a clock (separate from the microprocessor clock), such as may be useful to facilitate communication with circuit elements and/or other devices; master-in slave-out (MISO) circuitry 818 and master-out slave-in (MOSI) circuitry 820 to manage inter-element communications; LED control circuitry 822 to control activation of various LEDs to indicate operating mode, to indicate operating status, and/or to facilitate system debugging; and debugging circuitry 824.

Referring to FIG. 8B, audio circuitry 800B includes an audio chip 826 configured to pre-process an audio signal before it is transmitted to the microcontroller 802 (e.g., shift audio bias, increase amplitude, etc.). In particular, audio circuitry 800B includes audio input circuitry 828 (e.g., audio input jack), power mode selection circuitry 830, and debugging signal header 832. Mode selection circuitry 800C enables selection of a mode of the microprocessor 802 (e.g., action, standby, etc.), and may provide pinging functionality. Debugging circuitry 800D includes a debugging header 834. Communication circuitry 800E includes a communication header 836 and manages communications with various circuit elements and/or other devices.

Referring to FIG. 8C, board power circuitry 800F provides power conditioning and distribution for the circuit board. Audio power circuitry 800G provides conditioned power for audio components. MCU (microcontroller unit) power circuitry 800H provides conditioned power for the MCU. MCU power indicator circuitry 800I serves to indicate power status for the MCU (e.g., using an LED). Event circuitry 800J provides circuit triggering functionality (e.g., employing one or more user inputs). MCU state circuitry 800K serves to indicate a state for the MCU (e.g., using an LED). Motor actuation circuitry 800L serves to control actuation of at least one motor, which may provide vibratory or other tactile feedback to a user. Motor connection circuitry 800M facilitates connection and communication with a motor.

Figure 9:
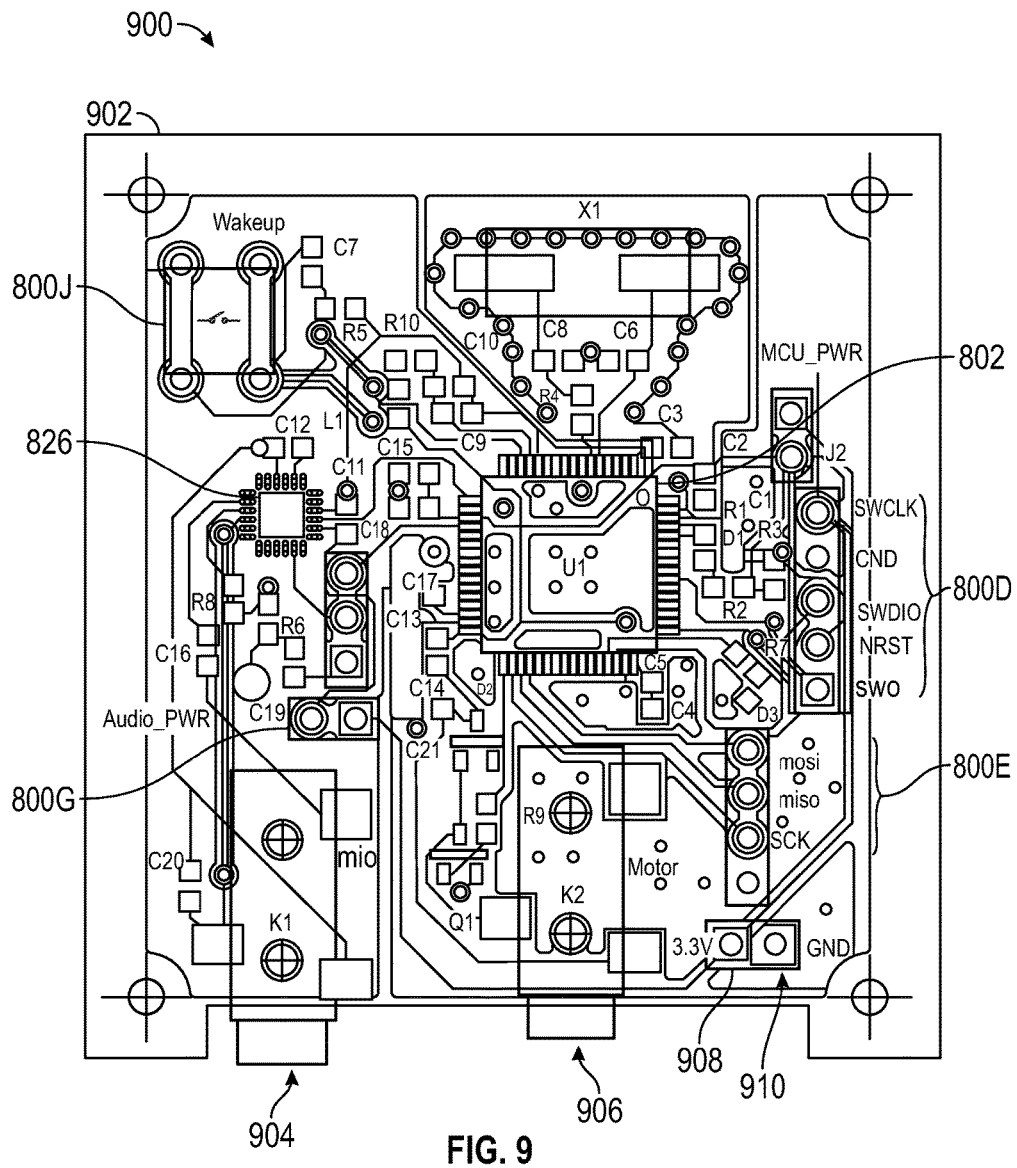
FIG. 9 is a diagram of a computer chip incorporating the electronic circuitry of FIGS. 8A-8C.

FIG. 9 is a layout diagram 900 of hardware 902 incorporating at least a portion of the electronic circuitry of FIGS. 8A-8C. As shown, the hardware 902 includes a microprocessor 802, an audio chip 826, event circuitry 800J, audio power circuitry 800G, a microphone 904, a motor 906, power in terminals 908, ground terminal 910, a communication circuit 800E, and debugging circuitry 800D. Of course, additional or fewer circuits from FIGS. 8A-8C may be included in the hardware 902. It is to be appreciated that FIGS. 8A-8C and FIG. 9 are provided for purposes of illustration only, and that numerous other implementations may embody the structures and/or provide the functionality identified in the claims.

Upon reading the following description in light of the accompanying drawing figures, those skilled in the art will understand the concepts of the disclosure and will recognize applications of these concepts not particularly addressed herein. Those skilled in the art will recognize improvements and modifications to the preferred embodiments of the present disclosure. All such improvements and modifications are considered within the scope of the concepts disclosed herein and the claims that follow.

What is claimed is:

1. A speech therapeutic device comprising:
  audio input circuitry configured to provide an input signal that is indicative of speech provided by a user;
  signal processing circuitry configured to utilize at least one reconfigurable rule that includes at least one condition, wherein the signal processing circuitry is further configured to:
    receive the input signal;

process the input signal using the at least one reconfigurable rule; and
provide an alert signal responsive to attainment of the at least one condition; and
stimulus circuitry coupled to the signal processing circuitry, the stimulus circuitry configured to receive the alert signal and provide a stimulus to the user;
wherein the signal processing circuitry is additionally configured to
generate a record indicative of the alert signal, store the record in a memory, and send the record to at least one communication network; and
wherein the record comprises a rule identifier and an audio segment indicative of the speech provided by the user at least one second before the alert signal and at least one second after the alert signal.

2. The speech therapeutic device of claim 1, wherein the signal processing circuitry is further configured to receive the at least one reconfigurable rule from the at least one communication network.

3. The speech therapeutic device of claim 1, wherein the signal processing circuitry comprises audio processing circuitry.

4. The speech therapeutic device of claim 1, wherein the record comprises a time stamp indicative of the alert signal.

5. The speech therapeutic device of claim 1, wherein the record comprises a location identifier.

6. The speech therapeutic device of claim 1, wherein the speech therapeutic device comprises at least one of a behind-the-ear device, an ear-mold device, a headset, a headband, or a smartphone.

7. The speech therapeutic device of claim 1, wherein the at least one condition comprises an energy level of the speech indicative of a volume level, and a time interval.

8. The speech therapeutic device of claim 7, wherein parameters of the at least one reconfigurable rule are configured to be altered to adjust a volume level threshold of the at least one condition.

9. The speech therapeutic device of claim 1, wherein the at least one communication network comprises at least one of a personal area network (PAN), a local area network (LAN), or a wide area network (WAN).

10. The speech therapeutic device of claim 1, wherein the at least one communication network comprises the Internet.

11. The speech therapeutic device of claim 1, wherein the at least one reconfigurable rule further includes at least one action that is to be performed when the at least one condition is attained, the at least one action comprising providing to the user at least one of a tactile stimulus, an audible stimulus, or a visual stimulus.

12. The speech therapeutic device of claim 11, wherein the at least one action comprises providing a voice to the user, wherein the voice indicates at least one speech improvement technique.

13. The speech therapeutic device of claim 1, comprising at least one of the following features (A) or (B): (A) the audio input circuitry comprises at least one bone conduction microphone; or (B) the stimulus circuitry comprises at least one bone conduction speaker.

14. The speech therapeutic device of claim 1, wherein at least one condition comprises at least one of a phonation quality, a stutter condition, or a stammer condition.

15. A speech therapeutic system comprising:
a speech therapeutic device according to claim 1; and
at least one communication server connected to the at least one communication network, wherein the at least one communication server is configured to perform at least one of the following functions (A) or (B): (A) sending the at least one reconfigurable rule to the at least one communication network, or (B) receiving a record from the at least one communication network.

16. The speech therapeutic system of claim 15, further comprising a graphical administrator interface configured to permit a speech pathologist or other speech therapeutic professional to monitor the speech therapeutic device and reconfigure the at least one reconfigurable rule.

17. A non-transitory computer readable medium containing program instructions for causing a speech therapeutic device to perform a method utilizing at least one reconfigurable rule that includes at least one condition, the method comprising:
receiving an input signal that is indicative of speech provided by a user;
processing the input signal using the at least one reconfigurable rule;
providing an alert signal responsive to attainment of the at least one condition;
providing a stimulus to the user indicative of the alert signal; and
generating a record indicative of the alert signal, storing the record in a memory, and sending the record to at least one communication network, wherein the record comprises a rule identifier and an audio segment indicative of the speech provided by the user at least one second before the alert signal and at least one second after the alert signal.

18. The non-transitory computer readable medium of claim 17, wherein the method further comprises receiving the at least one reconfigurable rule from the at least one communication network.

19. A method of operating a speech therapeutic device, the method comprising:
receiving an input signal that is indicative of speech provided by a user;
processing the input signal using at least one reconfigurable rule;
providing an alert signal responsive to attainment of at least one condition; and
providing a stimulus to the user indicative of the alert signal; and
generating a record indicative of the alert signal, storing the record in a memory, and sending the record to at least one communication network, wherein the record comprises a rule identifier and an audio segment indicative of the speech provided by the user at least one second before the alert signal and at least one second after the alert signal.

20. The method of claim 19, further comprising receiving the at least one reconfigurable rule from the at least one communication network.

* * * * *